(No Model.)
J. KIRKWOOD.
AUTOMATIC WATERING APPARATUS FOR STOCK, &c.
No. 583,261.  Patented May 25, 1897.
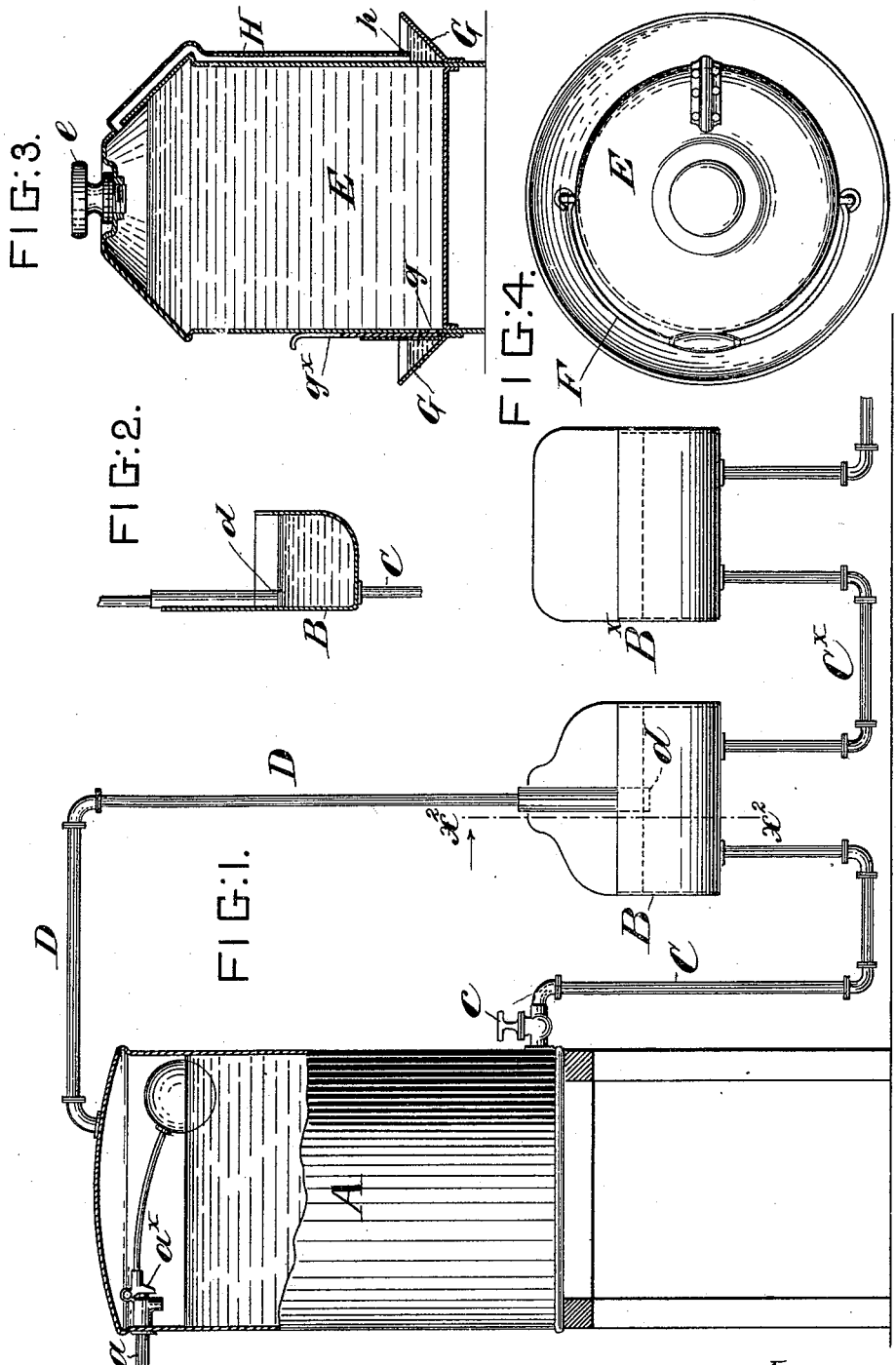
Witnesses:
J. W. Zimmer
Peter S. Ross
Inventor:
John Kirkwood
by Henry Connett
his Attorney

UNITED STATES PATENT OFFICE.

JOHN KIRKWOOD, OF LENOX, MASSACHUSETTS.

AUTOMATIC WATERING APPARATUS FOR STOCK, &c.

SPECIFICATION forming part of Letters Patent No. 583,261, dated May 25, 1897.

Application filed March 6, 1897. Serial No. 626,194. (No model.)

*To all whom it may concern:*

Be it known that I, JOHN KIRKWOOD, a citizen of the United States, residing at Lenox, Berkshire county, Massachusetts, have invented an Improved Automatic Watering Apparatus for Stock, &c., of which the following is a specification.

This invention relates to automatic means for supplying water to troughs for cattle and fowls, the object being to maintain automatically a substantially uniform level of the water in the trough or troughs at all times, the supply being obtained from a suitable tank or reservoir which may be filled either by hand or from a service-pipe, as convenience or circumstances may dictate.

In the accompanying drawings two embodiments of the invention are shown, one adapted for watering cattle or horses and the other a portable device for watering fowls.

Figure 1 is a side elevation of the apparatus as adapted for watering stock, and Fig. 2 is a section of one of the troughs on the line $x^2$ in Fig. 1. Fig. 3 is a vertical mid-section, and Fig. 4 a plan, of the apparatus adapted for watering fowls.

The construction illustrated in Figs. 1 and 2 will be first described.

A represents a hermetically-closed supply-tank for water sufficiently elevated to allow the water to flow therefrom to the trough or troughs by gravity. The water may be supplied to this tank from a service-pipe $a$, controlled by an ordinary ball-cock $a^\times$. This mode of supplying the tank, however, is not essential to my invention.

B is a trough to be supplied from the tank A. This trough may have any suitable shape and be of any required dimensions. The water is supplied to the trough from the tank by a pipe C, preferably controlled by a cock $c$.

An air-pipe D leads from the top of the tank A, above the high-water level therein, to the trough B, extending down therein to about the level to which it is desired the water shall rise in the trough.

The operation will be obvious. The tank A being hermetically closed the water will flow to the trough B and rise in the same until it seals the pendent end $d$ of the air-pipe, when it can rise no higher, as no air can enter the tank to replace it. When the water falls in the trough to a level low enough to unseal the pendent end of the air-pipe, air will flow to the tank and permit water to flow to the trough and replenish it; but the flow will cease as soon as the water again rises high enough in the trough to seal the air-pipe.

Only one trough B has been described; but obviously any desired number may be supplied from the tank A, one trough $B^\times$ being shown, which is supplied from the tank through the trough B by a pipe $C^\times$. The water will rise and fall in the trough $B^\times$ to the same extent that it rises and falls in trough B. Of course each trough may be independent and have an independent air-pipe, and this may be desirable in some locations; but where the troughs are arranged side by side or in a series the construction shown in Fig. 1 will suffice. The troughs may be, of course, at any desired distance from the supply-tank A.

Figs. 3 and 4 illustrate a portable device or apparatus operating on the same principle as that already described for supplying water to fowls. In this construction E represents a tank, preferably of cylindrical form, with a conical top and provided with a bail-handle F for carrying it. This tank is closed hermetically by a screw-plug $e$ in its top, which closes its filling-inlet. About the lower part of the tank is an annular trough G, secured to the tank, and in the wall of the tank at its bottom is an outlet-aperture $g$, through which the water flows to supply the trough. This outlet is adapted to be closed by a slide $g^\times$, mounted in suitable guides on the side of the tank. An air-pipe H leads from the top or upper part of the tank E down to the trough, its lower end $h$ depending to the water-level therein. The operation is the same in substance as that described with reference to Fig. 1. By removing the screw-plug $e$ the tank is filled with water, the outlet $g$ being closed during the filling by the slide $g^\times$. The screw-plug being now replaced, so as to hermetically close the tank, and the latter put in position in the chicken house or yard, as desired, the slide $g^\times$ is drawn up and the water allowed to flow to the trough G. It will rise in the trough until it seals the end $h$ of the air-pipe and will be maintained substantially at that level so long as there is water in the tank E. The object in making the top of the tank E conical is to prevent the chickens or other fowls from alighting on it.

Having thus described my invention, I claim—

1. An automatic watering apparatus for animals, comprising as its essentials a hermetically-closed supply-tank, an open trough adapted to be supplied by gravity from said tank, and an air-pipe extending from the upper part of said supply-tank, above the high-water level therein, to the trough and the open end of said pipe at the trough so situated as to be sealed by the water in the trough when the water rises to the predetermined level therein, substantially as set forth.

2. An automatic watering apparatus for animals, comprising an elevated, hermetically-closed supply-tank A, a trough B, to be supplied from said tank, a cock-controlled pipe C, connecting the tank with said trough, and an air-pipe D, connecting the top of the supply-tank with the trough, the open, lower end, $d$, of the said air-pipe being situated at about the predetermined water-level in the trough, whereby the rise of water in the trough seals the end $d$ of the pipe, substantially as set forth.

In witness whereof I have hereunto signed my name in the presence of two subscribing witnesses.

JOHN KIRKWOOD.

Witnesses:
JAS. A. CAMPBELL,
HARRY E. KENDALL.